United States Patent [19]
Ohshita

[11] 3,709,053
[45] Jan. 9, 1973

[54] MULTI-SPEED TRANSMISSION FRONT GEAR MECHANISM FOR A BICYCLE

[76] Inventor: Masakazu Ohshita, c/o Shimano Industrial Co. Ltd. 77, 3-cho Oimatsu-cho, Sakai City, Japan

[22] Filed: Nov. 16, 1970

[21] Appl. No.: 89,594

[30]  Foreign Application Priority Data

May 26, 1970  Japan ..................................45/52068

[52] U.S. Cl. .................................74/243 R, 74/217 B
[51] Int. Cl. .........................F16h 55/30, F16h 11/04
[58] Field of Search.........................74/217 B, 243 R

[56]  References Cited

UNITED STATES PATENTS 2,491,121  12/1949  Lozinski..............................74/217 B

*Primary Examiner*—Leonard H. Gerin
*Attorney*—McGlew and Toren

[57]  ABSTRACT

A multi-speed transmission front gear mechanism for a bicycle secured to a crank shaft and rotatable along therewith, wherein every second gear tooth of a high speed gear is previously cut so that the driving chain is engageable with the alternately cut gear teeth. This arrangement proves to be useful especially when the driving chain is to be shifted from a low speed gear into a high speed gear since the shifting operation can be effected and reliably how great the differential is in number of the gear teeth between the high speed and low speed gears.

3 Claims, 9 Drawing Figures

INVENTOR.
MASAKAZU OHSHITA
BY
McGlew and Toren
ATTORNEYS

INVENTOR.
MASAKAZU OHSHITA
BY McGraw and Toren
ATTORNEYS

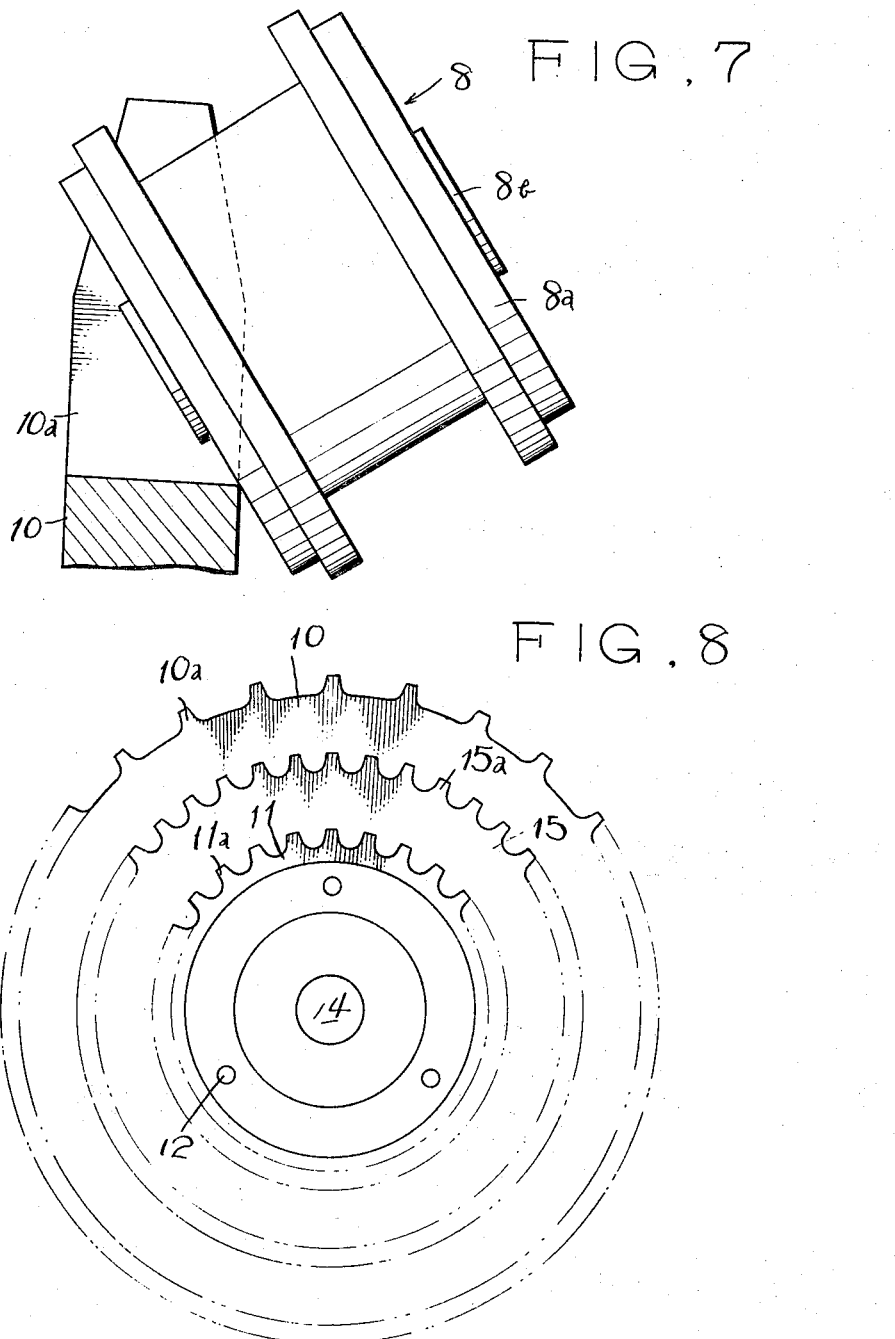

MULTI-SPEED TRANSMISSION FRONT GEAR MECHANISM FOR A BICYCLE

The present invention relates to a front gear mechanism for a bicycle secured to a crank shaft rotatable by working the pedal, and more in particular to such a type of multi-speed transmission front gear mechanism that comprises a plurality of gears respectively provided in the outer periphery thereof with a different number of dents; said plurality of gears being selectively engageable with the driving chain through means of an independently mounted gear shifting device rotatable together with the crank shaft by the rotation of the pedal so that these gears can transmit the rotatory power of the crank shaft as far as the bicycle wheel at a predetermined speed rate thereby to drive a bicycle.

Conventionally speaking, it has been a well-known art to construct a multi-speed transmission front gear mechanism for a bicycle by mounting a plurality of gears having each different number of dents on the crank shaft and change the speed of a bicycle into a desired speed rate by engaging any selected one of these gears with the driving chain through means of said independently mounted gear shifting device. However, a requirement has been raised in recent years that these multi-speed transmission front gears should be made respectively with a more extremely differed number of dents; and for the time being, use is practically made for example of such a multi-speed transmission front gear mechanism that comprises a gear having a maximum number of 50 dents down to a gear having a minimum number of 36 dents. Since the greater the differential of the dent number between the gears the more the speed ratio cannot but be changed as has been just mentioned, it is possible for a rider to run a bicycle on any running conditions, especially running it even along a slope in a comfortable manner.

However, such a mechanism of conventional type is accompanied with deficiencies that shifting operation must be made with difficulty, taking a long time and sometimes it is not effected satisfactorily because of the big difference in dent number between the gears.

In the case of shifting the driving chain from a larger dent-numbered high speed gear into a small dent-numbered low speed gear, shifting operation can be more easily effected by shifting the driving chain from the low speed gear into the high speed gear, the dents of the high speed gear hit one after another against the links of the driving chain and skip over them even if the driving chain is forcibly pushed on the high speed gear by operating the gear shifting device so that the high speed gear cannot engage with the driving chain thereby making it difficult to effect the shifting operation and giving rise to the above-mentioned disadvantages.

Since these disadvantages increase according as the number of dents is more differed between the high speed and low speed gears, it is necessary to exactly decide the mounting position of the gear shifting device in relation to these gears.

Moreover, in the case of shifting these gears the driving chain is not always engaged exactly with the dents of the high speed gear; on some occasions it strikes against the top portions of the dents and go deep into therebetween all with a bound as soon as the gear shifting operation has been effected thereby giving a shock and a resultantly uncomfortable ride to a rider.

Accordingly, the present invention has been designed to eliminate all the above-mentioned disadvantages, and in which; it is one of the main objects of the invention to provide a multi-speed transmission front gear mechanism that no matter how extremely the number of dents is differed between the gears, the gear shifting operation can exactly and smoothly effect whenever it is necessary to shift the driving chain from one of the gears into the other, for example from the low speed gear into the high speed gear. It is another object of the invention to provide a multi-speed transmission front gear mechanism that no matter how extremely the number of dents is differed between the gears, the gear shifting operation can effect smoothly and quickly at any time when it is necessary, without fear that the driving chain may strike against the top portions of some gear dents. Further it is another object of the invention to provide a multi-speed transmission front gear mechanism that the gear shifting device can be mounted substantially in a free positional relation with the mechanism without being strictly restricted within a pre-determined area.

Thus the present invention aims at accomplishing the abovementioned objects by employing a conventional type of multi-speed transmission front gear mechanism without modifying the structure of a device for shifting the driving chain.

I have found out through investigations the reason why the conventional type of multi-speed transmission front gear mechanism cannot secure the exact operation of shifting one gear into another is because the top portions of the gear dents hit one after another against the links of the driving chain and skip over them. In the present invention, therefore, every second gear dent of the high speed gear is specially cut so as to enable the driving chain to move positively along the root of the first dent on which the driving chain has hit thereby to engage with the second dent without failure.

The detail of the invention is as accounted for hereinafter with reference to the accompanying drawings and the novel construction of the invention is as defined in the appended claims.

In the drawings showing the embodiments of the invention,

FIG. 7 is likewise an enlarged side view of the present invention illustrating how the relation of the driving chain is to the gear dents when the gear shifting operation is effected; and FIGS. 8 and 9 are the back surface views respectively showing other embodiments of the invention.

Figure 1:
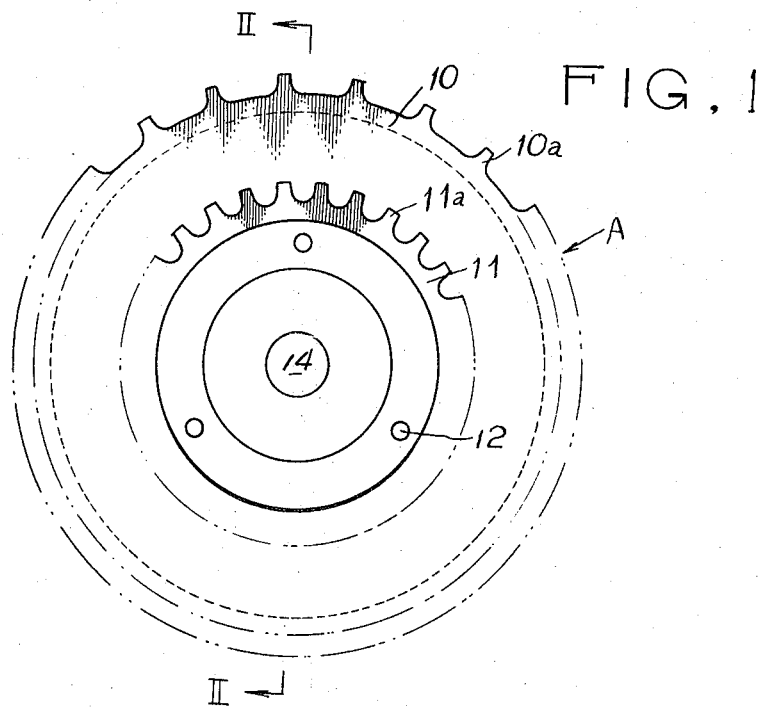
FIG. 1 is a back surface view of a multi-speed transmission front gear mechanism according to the invention.
Figure 2:
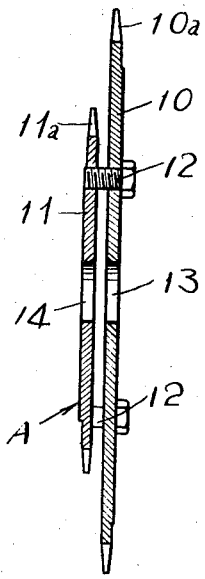
FIG. 2 is a vertical section taken along the line 11—11 of FIG. 1.
Figure 3:
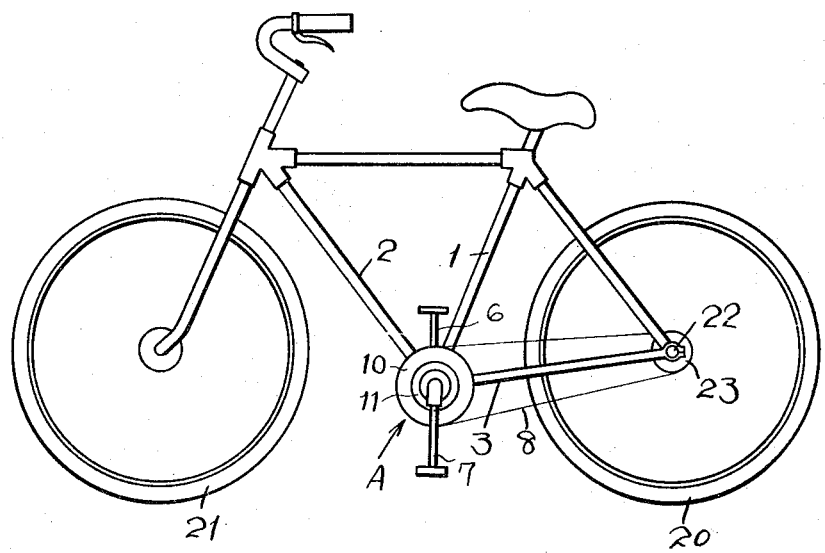
FIG. 3 is a front view showing the whole body of a bicycle wherein the multi-speed transmission front gear mechanism is mounted on a crank shaft.

Referring in detail to the front gear mechanism of the invention with reference to the accompanying drawings, a multi-speed transmission mechanism A shown in FIG. 1 comprises two or more gears 10, 11 provided respectively with a different number of gear dents around the outer periphery thereof.

Said front gear A is secured to a crank shaft 5 so as to rotate integrally therewith. The crank shaft 5 is normally positioned midway between the front wheel and the rear wheel of a bicycle and moveably mounted through bearings to a bracket 4 to which each end of a seat tube 1, a down tube 2 and a chain stay 3 is inseparably connected as is clearly shown in FIG. 4. To both ends of the crank shaft 5 are secured a right crank 6 and a left crank 7. On each end of these cranks 6, 7 are pivotally supported foot pedals (not shown) for rotating the crank shaft 5 thereby to rotate the front gear A together. Between any selective one of the gears provided in the front gear A and a sprocket 23 secured to either the rear wheel 20 or the front wheel 21 there is stretched a driving chain 8 which transmits the rotary power of the front gear A to either these wheels thereby to rotate the same and result in running a bicycle.

Of the gears 10 and 11 which constitute the multi-speed transmission front gear A, the largest diametered and maximum dent-numbered gear 10 constitutes a gear for high speed whereas the smallest diametered and minimum dent-numbered gear 11 constitutes a gear for low speed.

Figure 4:
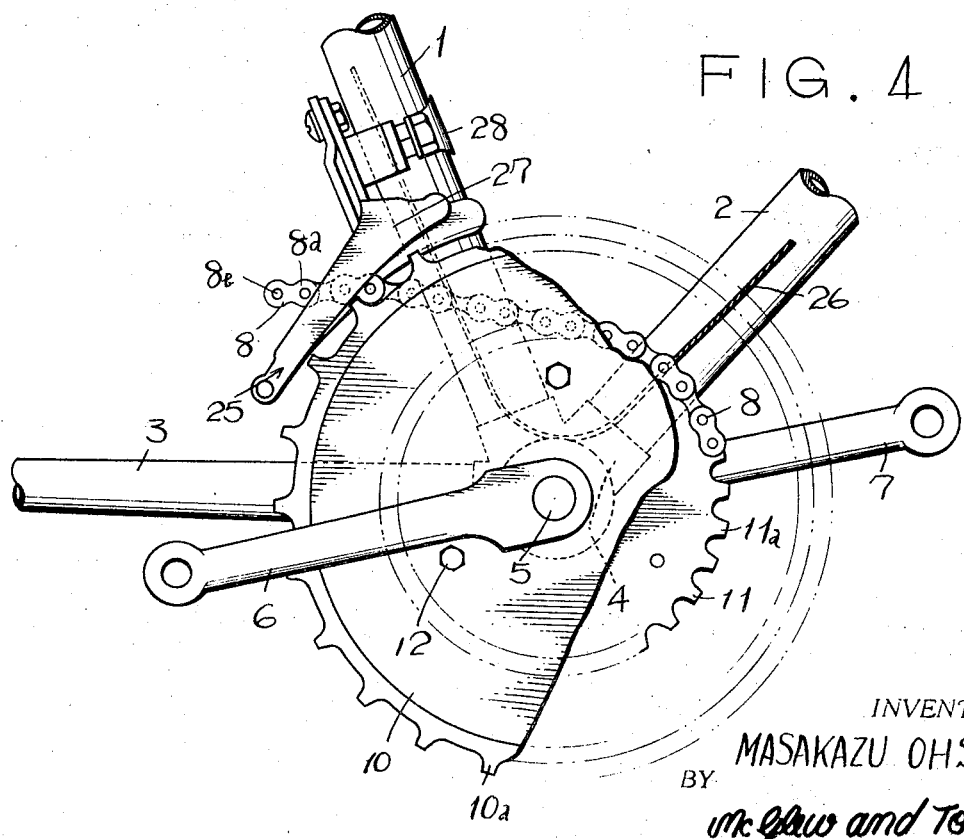
FIG. 4 is a front view showing the principal elements thereof.
Figure 5:
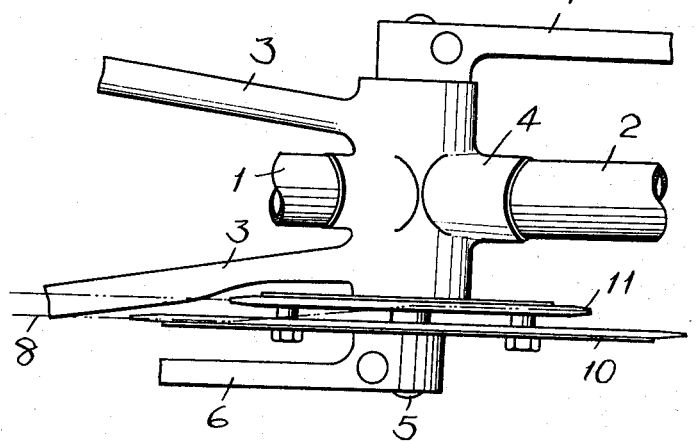
FIG. 5 is a plan view showing the same.

The driving ratio per rotation of the pedal can be selectively changed by engaging the driving chain with any one of the dents 10a, 11a of these gears 10, 11. This selectable engagement of the driving chain 8 is made possible by means of a driving chain shifting device 25 mounted on the seat tube 1 which, as is well known, is composed of a guide means 27 movable axially of the crank shaft 5 by the operation of a wire rope 26 and a clip 28 for supporting said guide means 27 on the seat tube 1. As is shown in FIG. 4, the driving chain is held by means of this guide means 27.

When the wire rope 26 is operated for example by the manipulation of a lever mounted on a handle bar, the guide means 27 is moved to press the driving chain 8 to the side of either the gears 10, 11 thereby effecting the shifting operation of the driving chain.

Figure 6:
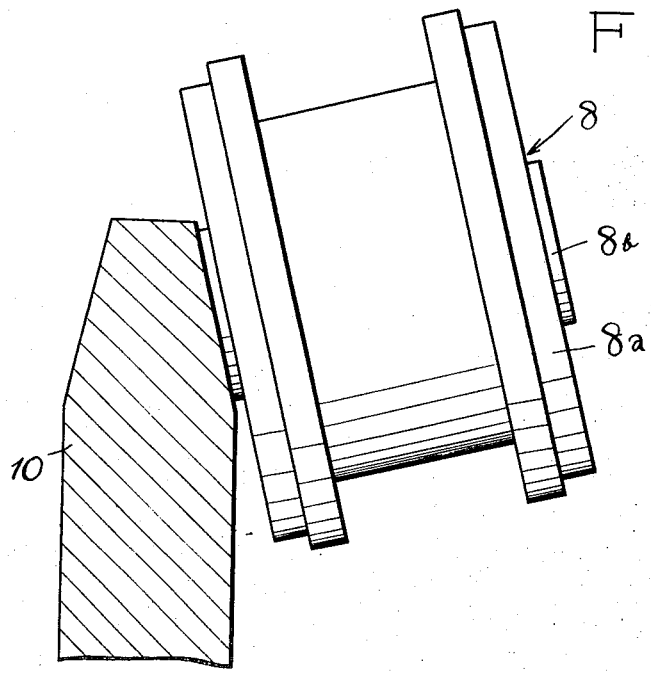
FIG. 6 is an enlarged side view of a conventional front gear illustrating how the relation of the driving chain is to the gear dents when the gear shifting operation is effected.
Figure 9:
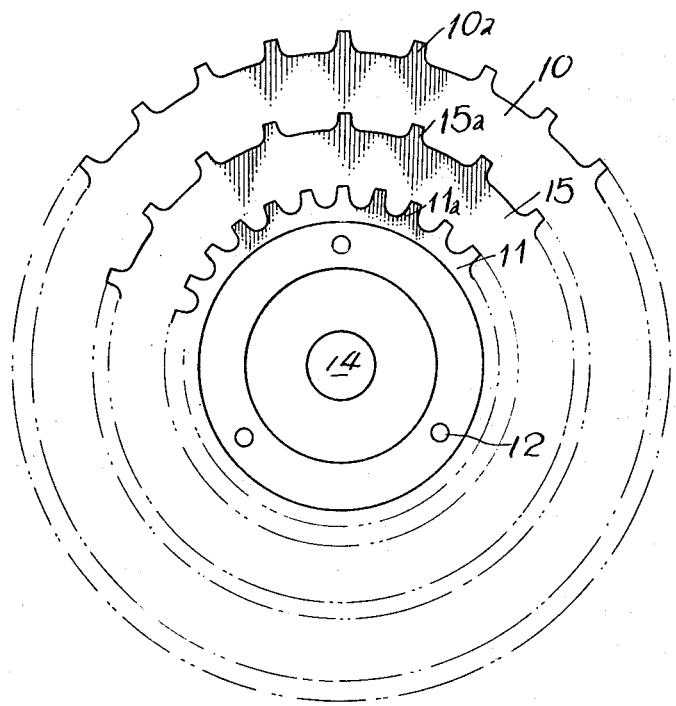

The above-mentioned construction of a front gear mechanism is conventionally well known and not inclusive of any novel art, in which even if the guide means 27 is operated to press the driving chain 8 against the side of the high speed gear 10 so as to shift from low speed into high speed, the high speed gear 10 is idly rotated because the driving chain chafes against the side thereof as is shown in FIG. 6, and skips over it so that the dents 10a of the gear 10 cannot easily engage with the driving chain 8.

The multi-speed transmission front gear A according to the present invention has on the whole the same construction of the above-mentioned conventional type with the exception that it is provided with a plurality of gears respectively having different diameters, of which the gear 10 having the largest diameter and maximum numbered dents has its dents 10a cut alternately so as to form regularly spaced apart intervals therebetween which correspond to one pitch of the driving chain 8 or the length of each chain pin 8b for connecting the ends of a plurality of links 8a forming the driving chain 8 thereby engaging the latter with each alternate dent 10. In other words, the links 8a engaged with the dent 10a are not engageable with this dent 10a and are in an idle relation therewith.

In the drawing, reference numeral 12 designate pins for connecting the gears 10, 11 to each other which are thereby held at regularly spaced apart intervals and prevented from being swayed.

The multi-speed transmission front gear mechanism A having the above-mentioned construction is fixed to the crank shaft 5 as has been described hereinbefore, the fixture being made possible when these gears 10, 11 are integrally connected to each other by means of said pins 12 and the crank shaft 5 is inserted into the holes 13, 14 respectively provided in each center of the gears 10, 11 in the manner that one side of the high speed gear 10 is placed in contact with the crank 6, or otherwise when the front gear A is secured to the crank 6 thereby to be mounted on the crank shaft 5.

In addition, this fixture is also made possible by providing a spline groove or a key groove in a certain portion of the crank shaft 5 and forming a valley engageable with said groove in each center hole of the gears 10, 11 thereby to secure the front gear A directly to the crank shaft 5 through these groove and valleys both tightly engaged.

According to the present invention, when a rider operates the driving chain 8 from the low speed gear 11 into the high speed gear 10, the driving chain 8 is pressed against the side of the high speed gear 10 and a desired link 8a positioned at the side where the driving chain 8 has been moved is easily dropped into the root of the dents 10a under the pressing force induced by the driving chain shifting device 25, and the posture of the dropped link 8a is in an inclined relation with the low speed gear 10 whereby the following dent 10a can easily pick up this inclined link 8a and engage therewith. Further according to the invention, it is quite possible, as has been understood, to shift low speed into high speed no matter how great the differential of dent number may be between the high speed and low speed gears. Moreover, the link 8a of the driving chain 8 does not skip over the dents 10a of the high speed gear 10 when in contact therewith, and the dent 10a never fails to catch a desired link 8a of the driving chain 8 so that the driving chain shifting operation can be easily and smoothly effected when the link 8a of the driving chain 8 is dropped into the root of the dents 10a so as to take an inclined posture, whereby minimizing the frictional wear between the links 8a and the dents 10a.

Furthermore, it is also possible to obviate the driving chain from being caught in the end of any selected dent 10a thereby to enable a rider to ride a bicycle smoothly since all the dents 10a of the high speed gear 10 never fail to engage with the link 8a of the driving chain 8.

On the contrary, when the driving chain 8 is shifted from the high speed gear 10 into the low speed gear 11, it is easily disengaged out of the high speed gear 10 since the dents 10a are cut alternately beforehands so that the driving chain operation can be very easily and promptly effected without fail.

Therefore according to the present invention it is possible not only to shift the driving chain from high speed into low speed as in the case with the conventional type of a gear shifting device but also the to effect this shifting operation promptly and reliably since the dents 10a of the high speed gear 10 are cut alternately beforehands so as to enable the driving chain to be disengaged easily from the gear 10.

As has been mentioned, the present invention provides a novel device which is very simple in construction and yet effective in prompt and reliable shifting operation of the driving chain from high speed into low speed and vice versa regardless of the big differential in the dent number between the high speed and low speed gears, whereby a rider is able to ride a bicycle with ease by operating the driving chain shifting device 25 with the result that the gear shifting device is not forced to operate so excessively as to get out of order, disengaging the driving chain from a selected gear.

Furthermore since the position for mounting the gear shifting device is not strictly restricted, the mounting work of said device can be accomplished as freely as is desired.

In the accompanying drawings a multi-speed transmission front gear mechanism comprizes a pair of high speed and low speed gears 10, 11, of which the high speed gear 10 is drawn as being possessed of the largest number of dents alternately cut at regularly spaced apart intervals corresponding to one pitch of the driving chain. However, neither the dent number of this high speed gear is particularly restrictive nor the gear having alternately cut dents is limited to the high speed gear.

For a fuller understanding, a multi-speed transmission front gear mechanism normally comprises a pair of high speed and low speed gears. However, the mechanism according to the present invention can be constructed with a trio of gears in which an intermediate speed gear 15 is interposed between the high speed and low speed gears 10 and 11 as is clearly shown in FIG. 8, or with a more number of gears. In such a case the dents 15a of the intermediate speed gear 15 may be desirably cut alternately, to say nothing of the high speed gear 10.

It is to be noted that the present invention is not to be restricted to the constructed disclosed herein since many modifications and changes thereof may be made without departing from the spirit and scope of the following claims.

What is claimed is:

1. A multi-speed transmission front gear mechanism secured to a crank shaft rotatable by the operation of a pedal, a driving chain for transmitting the rotary power of said crank shaft to a bicycle wheel, said driving chain including spaced apart links and spaced pins interconnecting said links, each adjacent pair of said pins spaced an equal distance apart, said front gear mechanism comprising a low speed gear having dents positioned at equally spaced apart first intervals for engagement with said driving chain and secured to said crank shaft, a high speed gear having a larger diameter than said low speed gear and secured to said crank shaft at the side of said low speed gear, said high speed gear having dents disposed at equally spaced apart second intervals formed in an alternately spaced arrangement relative to the dents of said low speed gear and the spaced apart second intervals being twice the length of said first intervals, whereby when said driving chain is engaged with said high speed gear, the dents of said high speed gear are engaged between every other said pair of pins while when said driving chain is engaged with said low speed the dents of said low speed gear are engaged between every pair of said pins, and a means for securing said low speed and high speed gears to the crank shaft at a regularly laterally spaced apart interval.

2. A multi-speed transmission front gear mechanism, as set forth in claim 1, wherein an intermediate speed gear is mounted between said high speed gear and said low speed gear with said intermediate speed gear having dents formed at the same interval as the second interval of the dents of said high speed gear.

3. A multi-speed transmission front gear mechanism, as set forth in claim 1, including a pair of laterally adjacent high speed gears each having a different diameter and having the same spaced apart second intervals between the dents thereon.

* * * * *